Figure 1:
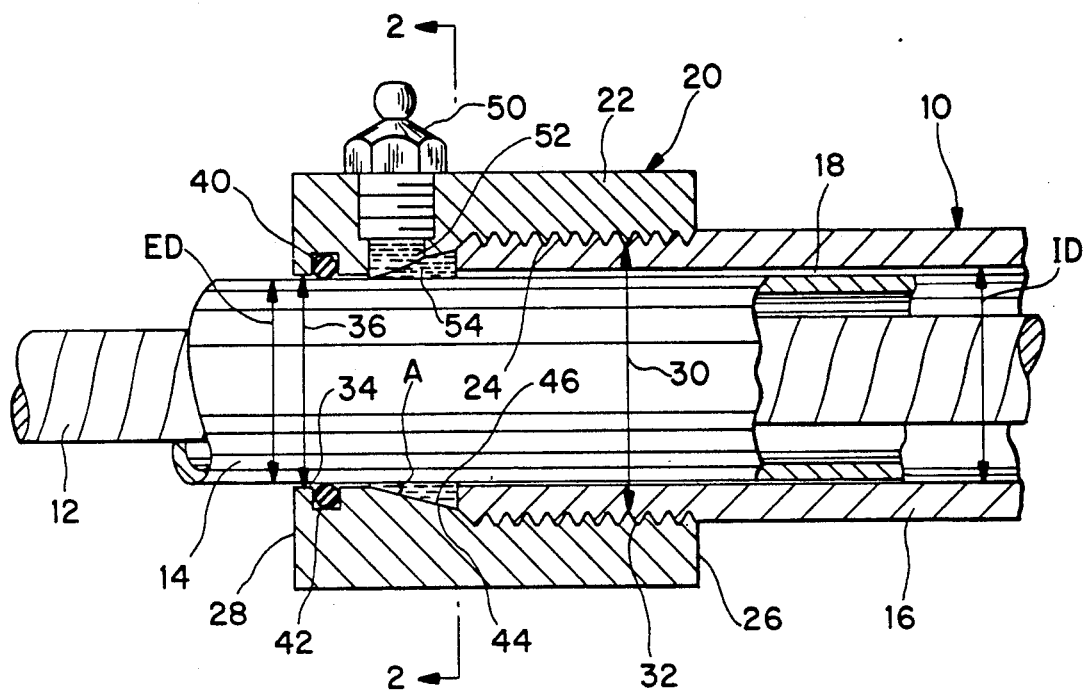

United States Patent [19]

Brushaber

[11] Patent Number: 5,326,292
[45] Date of Patent: Jul. 5, 1994

[54] LUBRICATION ADAPTOR FOR A MARINE STEERING SYSTEM

[76] Inventor: Donald Brushaber, 221 Hayes Ct., Normandy Beach, N.J. 08739

[21] Appl. No.: 109,303

[22] Filed: Aug. 19, 1993

[51] Int. Cl.$^5$ ............................................. B63H 25/00
[52] U.S. Cl. ..................................... 440/62; 74/502.6; 184/15.1; 114/144 R
[58] Field of Search ............... 440/62, 63, 53, 113; 114/144 R; 184/6.19, 14, 15.1, 15.2, 105.3; 74/502.6, 480 B

[56] References Cited

U.S. PATENT DOCUMENTS

| | | | |
|---|---|---|---|
| 2,723,004 | 11/1955 | Schiesel | 184/14 |
| 4,415,064 | 11/1983 | Oliemuller | 184/15.1 |
| 4,735,165 | 4/1988 | Baba et al. | 440/62 |
| 4,815,994 | 3/1989 | Hickham, Jr. | 440/62 |
| 5,061,213 | 10/1991 | Burroughs | 440/63 |

*Primary Examiner*—Jesûs D. Sotelo
*Attorney, Agent, or Firm*—Samuelson & Jacob

[57] ABSTRACT

An improvement in a lubrication adaptor for a marine steering system in which the lubrication adaptor is threaded onto a control cable housing and provides for the lubricated telescopic movement of a tubular member relative to the control cable housing, the lubrication adaptor having a chamber extending between a seal and a clearance between the tubular member and the control cable housing for containing lubricant, the improvement including a tapered, frusto-conical surface contour configuration along the inner surface of the chamber, the frusto-conical configuration being oriented with a smaller diameter adjacent the seal and a larger diameter adjacent the clearance for urging the lubricant in the direction away from the seal and into the clearance.

10 Claims, 1 Drawing Sheet

U.S. Patent  July 5, 1994  5,326,292

LUBRICATION ADAPTOR FOR A MARINE STEERING SYSTEM

The present invention relates generally to marine steering systems and pertains, more specifically, to an improvement in a lubrication adaptor employed for lubricating relative telescopic movements between component parts of the steering system.

A marine steering system of the type in which an adaptor is employed for providing lubrication to component parts of the system to facilitate telescopic relative movements of the component parts is described in detail in U.S. Pat. No. 5,061,213, the disclosure in which patent is incorporated herein by reference to the patent. The present invention provides an improvement in such an adaptor, which improvement exhibits several objects and advantages, some of which are summarized as follows: Enhances the effectiveness of the lubrication adaptor so as to provide improved performance; employs a configuration which accomplishes more effective distribution of the lubricant supplied to the adaptor; lessens any tendency toward clogging of the lubricant and binding of the component parts; contributes toward ease of manufacture and installation; enables exemplary and reliable performance over a long service life.

The above objects and advantages, as well as further objects and advantages, are attained by the present invention, which may be described briefly as an improvement in a lubrication adaptor for a marine steering system in which a control cable is connected to a tubular member having an external diameter and being received within a control cable housing having an internal diameter, the relative dimensions of the external diameter of the tubular member and the internal diameter of the control cable housing providing a clearance between the tubular member and the control cable housing for telescopic axial movement of the tubular member relative to the control cable housing, and the lubrication adaptor includes a body extending axially between opposite ends, the body including a threaded bore having an internal diameter and extending axially from one end toward the other end of the body for threaded engagement with the control cable housing to secure the body to the control cable housing, a counterbore extending axially from the other end toward the one end of the body and having an internal diameter smaller than the internal diameter of the threaded bore and generally complementary to the external diameter of the tubular member, and a seal in the Counterbore for engaging the tubular member and sealing a lubricant placed between the threaded bore and the seal, the improvement comprising: a chamber in the body, the chamber extending axially between the threaded bore and the counterbore, for containing the lubricant; and a lubrication fitting communicating with the chamber for supplying the lubricant to the chamber; the chamber including an internal surface having a surface contour configuration tapered from a larger diameter adjacent the threaded bore to a smaller diameter adjacent the counterbore for urging the lubricant supplied to the chamber in the direction away from the seal and toward the clearance between the tubular member and the control cable housing.

Figure 2:
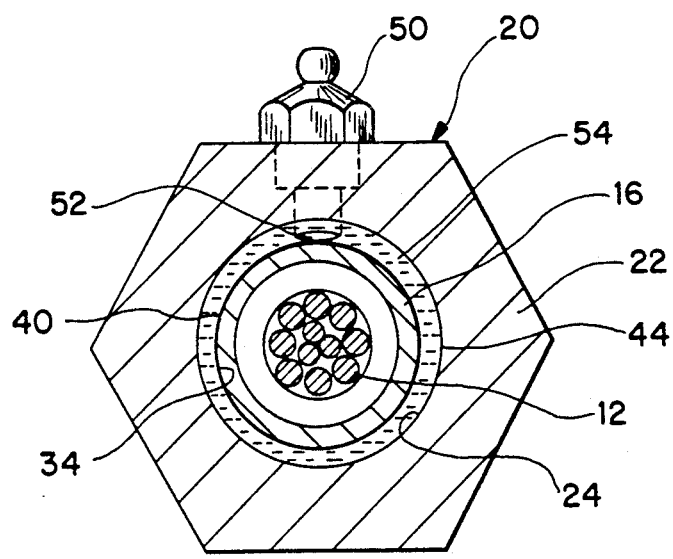

The invention will be understood more fully, while still further objects and advantages will be made apparent, in the following detailed description of a preferred embodiment of the invention illustrated in the accompanying drawing, in which:

FIG. 1 is a longitudinal cross-sectional view of a lubrication adaptor constructed in accordance with the present invention and installed in a marine steering system; and FIG. 2 is a transverse cross-sectional view taken along line 2—2 of FIG. 1.

Turning now to the drawing, a marine steering system 10 includes a control cable 12 connected to a tubular member 14, which tubular member 14 is received within a control cable housing 16, for telescopic movements relative to the control cable housing 16, all as described in detail in the aforesaid U.S. Pat. No. 5,061,213. Thus, the tubular member 14 has an external diameter ED, the control cable housing 16 has an internal diameter ID, and the relative dimensions of the external diameter ED and the internal diameter ID are such that a clearance 18 is provided between the tubular member 14 and the control cable housing 16 for facilitating relative telescopic movement between the tubular member 14 and the control cable housing 16.

A lubrication adaptor 20 is constructed in accordance with the present invention and is shown installed in the marine steering system 10. Lubrication adaptor 20 includes a body 22 having a threaded bore 24 extending axially from one end 26 of the body 22 toward the opposite end 28 of the body 22. Threaded bore 24 has an internal diameter 30 complementary to a threaded portion 32 of the control cable housing 16 and is installed in the marine steering system 10 by threaded engagement between the threaded bore 24 and the threaded portion 32 of the control cable housing 16, which secures the body 22 to the control cable housing 16, as shown. A counterbore 34 in the body 22 of the lubrication adaptor 20 extends axially from the opposite end 28 toward the one end 26 and has an internal diameter 36 smaller than the internal diameter 30 of the threaded bore 24, the counterbore 34 being generally complementary to external diameter ED of the tubular member 14. A dynamic seal 40 is seated within an annular groove 42 in the body 22 at the counterbore 34 and engages the tubular member 14.

A chamber 44 is located in the body 22 and extends axially between the threaded bore 24 and the counterbore 34. Chamber 44 includes an internal surface 46 having a contour configuration which is tapered at an angle A from a larger diameter adjacent the threaded bore 24 to a smaller diameter adjacent the counterbore 34. In the illustrated preferred embodiment, the angle A is about 20° and the contour configuration of the internal surface 46 is in the form of a frusto-conical contour configuration extending from a larger diameter at the threaded bore 24 to a smaller diameter at the counterbore 34.

A lubrication fitting 50 communicates with the chamber 44 through a transverse passage 52 in the body 22 intermediate the threaded bore 24 and the counterbore 34, and preferably is located axially immediately adjacent counterbore 34. Once the lubrication adaptor 20 is installed, by threading the threaded bore 24 onto the threaded portion 32 of the control cable housing 16, as shown, a lubricant 54 is supplied to the chamber 44 by being forced through the lubrication fitting 50 and into the chamber 44. The chamber 44 is filled with lubricant 54, and the tapered, frusto-conical contour configuration of the internal surface 46 of the chamber 44 urges the lubricant 54 in the direction away from the seal 40, toward and into the clearance 18 between the tubular member 14 and the control cable housing 16. It has been observed that the tapered contour configuration of the internal surface 46 of the chamber 44 provides an immediate effective distribution of the lubricant 54 for improved performance of the lubrication adaptor 20. Thus, any tendency toward clogging of the lubricant 54 and consequent possible binding of the tubular member 14 within the control cable housing 16 is reduced to a minimum. The more effective immediate distribution of the lubricant 54 provides a marked improvement in performance and enables a high degree of reliability over a longer service life. At the same time, the urging of the lubricant 54 in the direction away from the seal 40 places less stress on the seal 40 for improved integrity and longevity of the seal between the body 22 and the tubular member 14. The frusto-conical contour configuration is advantageous in that the configuration is readily manufactured and is effective without requiring any special installation skills or tools.

It will be seen that the present invention attains the objects and advantages summarized above; namely: Enhances the effectiveness of the lubrication adaptor so as to provide improved performance; employs a configuration which accomplishes more effective distribution of the lubricant supplied to the adaptor; lessens any tendency toward clogging of the lubricant and binding of the component parts; contributes toward ease of manufacture and installation; enables exemplary and reliable performance over a long service life.

It is to be understood that the above detailed description of a preferred embodiment of the invention is provided by way of example only. Various details of design and construction may be modified without departing from the true spirit and scope of the invention, as set forth in the appended claims.

The embodiments of the invention in which an exclusive property or privilege is claimed are defined as follows:

1. An improvement in a lubrication adaptor for a marine steering system in which a control cable is connected to a tubular member having an external diameter and being received within a control cable housing having an internal diameter, the relative dimensions of the external diameter of the tubular member and the internal diameter of the control cable housing providing a clearance between the tubular member and the control cable housing for telescopic axial movement of the tubular member relative to the control cable housing, and the lubrication adaptor includes a body extending axially between opposite ends, the body including a threaded bore having an internal diameter and extending axially from one end toward the other end of the body for threaded engagement with the control cable housing to secure the body to the control cable housing, a counterbore extending axially from the other end toward the one end of the body and having an internal diameter smaller than the internal diameter of the threaded bore and generally complementary to the external diameter of the tubular member, and a seal in the counterbore for engaging the tubular member and sealing a lubricant placed between the threaded bore and the seal, the improvement comprising:

a chamber in the body, the chamber extending axially between the threaded bore and the counterbore, for containing the lubricant; and a lubrication fitting communicating with the chamber for supplying the lubricant to the chamber;

the chamber including an internal surface having a surface contour configuration tapered from a larger diameter adjacent the threaded bore to a smaller diameter adjacent the counterbore for urging the lubricant supplied to the chamber in the direction away from the seal and toward the clearance between the tubular member and the control cable housing.

2. The improvement of claim 1 wherein the surface contour configuration is tapered at an angle of about 20°.

3. The improvement of claim 1 wherein the surface contour configuration of the internal surface of the chamber is a frusto-conical contour configuration.

4. The improvement of claim 1 wherein the larger diameter of the internal surface of the chamber is located at the threaded bore.

5. The improvement of claim 1 wherein the smaller diameter of the internal surface of the chamber is located at the counterbore.

6. The improvement of claim 1 wherein the larger diameter of the internal surface of the chamber is located at the threaded bore and the smaller diameter of the internal surface of the chamber is located at the counterbore.

7. The improvement of claim 6 wherein the surface contour configuration of the internal surface of the chamber is a frusto-conical contour configuration.

8. The improvement of claim 7 wherein the surface contour configuration is tapered at an angle of about 20°.

9. The improvement of claim 1 wherein the lubrication fitting communicates with the chamber at the tapered internal surface of the chamber.

10. The improvement of claim 9 wherein the lubrication fitting is located axially immediately adjacent the counterbore.

* * * * *